Patented July 31, 1934

1,968,156

UNITED STATES PATENT OFFICE 1,968,156

PROCESS OF PREPARING PHYSIOLOGICALLY ACTIVE EXTRACTS FROM THE ANTERIOR LOBES OF THE HYPOPHYSIS

Carl Ludwig Lautenschläger, Willy Ludwig, and Fritz Lindner, Frankfort-on-the-Main, Germany, assignors to Winthrop Chemical Company, Inc., New York, N. Y., a corporation of New York No Drawing. Application November 7, 1931, Serial No. 573,714. In Germany August 4, 1928

3 Claims. (Cl. 167—74)

The present invention relates to a process of obtaining physiologically active extracts from the anterior lobes of the hypophysis.

In British Patent No. 291,018 dated May 23, 1927, in the name of I. G. Farbenindustrie Aktiengesellschaft, a process of preparing physiologically active substances from the anterior lobes of the hypophysis is described. According to this known process the fresh anterior lobes of the hypophysis are extracted first with an organic solvent, liquid at ordinary temperature and capable of dissolving lipoids, and then with water. Thus an œstrus-retarding product and an œstrus-promoting product are obtained.

According to our present invention more favorable results especially as regards the strength of the aqueous extracts, are obtained in the production of the œstrus-promoting product, when the glands, after the œstrus-retarding constituents have been separated therefrom by a treatment with an organic solvent, liquid at ordinary temperatures and capable of dissolving lipoids, as for instance with acetone or alcohol, are subjected simultaneously with the subsequent extraction with water or a suitable aqueous salt solution, to a process of autolysis or to a process of digestion which is initiated by the addition of a suitable plant enzyme, such as papain, while allowing the mass to stand for several days at a temperature of about 20° C. to about 40° C., and in case of need, the aqueous extracts thus obtained are then treated with an organic solvent insoluble in water. The last expedient serves for removing any small quantities of the œstrus-retarding bodies which may be formed during the autolysis or the digestion.

The aqueous extracts can then be freed from any ballast substances, such as lipoids or the like, by a further treatment with a solvent insoluble in water.

The following example illustrates our invention.

5 grams of the dry preparation, obtained from the anterior lobes of the hypophysis freed from the oestrus-retarding constituents by extracting them with acetone, are digested for several days (preferably for 2 to 3 days) at a temperature of 20° C. to 25° C. with 0.5 gram of papain of 80% strength and 50 cc. of buffered or non-buffered water to which some preserving agent, for instance phenol or tricresol, has been added, after the digestion has been initiated by raising the temperature to 35° C. to 40° C. By well centrifuging the resulting mass a clear solution containing a small amount of albumen is obtained which, if required, is twice mixed with double the quantity of acetone, then isolated by filtration from the precipitating albuminous substances and finally freed from the acetone in a vacuum. The aqueous portion is then shaken out with ether and, after removal of the ether, tested on the body of the infantile mouse.

Instead of the dry preparations, there may also be used the fresh anterior lobes of the hypophysis, which have been freed from the œstrus-retarding substances by extraction with an organic solvent. Instead of the process of digestion, which is initiated by the addition of papain, there may also be applied a process of autolysis, which is based on the action of the enzymes contained in the glands and carried out by allowing the preparations to stand with water for several days at 20° C. to 25° C. and then working up the preparations in the same manner as indicated in the foregoing example.

As far as the process relates to the treatment of the anterior lobes of the hypophysis with water, we understand thereby not only a treatment with chemically pure water, but also a treatment with solutions commonly used in the art for producing aqueous extracts, such as physiological salt solution or Ringer's solution; the concentration of the hydrogen ions in the solution may be varied within wide limits.

This application contains subject matter in common with our application Serial No. 379,067, filed July 17, 1929, and is to be regarded as a continuation-in-part of said application.

We claim:

1. In the process of preparing physiologically active extracts from the anterior lobes of the hypophysis, the steps which comprise extracting the fresh anterior lobes of the hypophysis with an organic solvent, liquid at ordinary temperatures and capable of dissolving lipoids, separating the solution from the solid matter and allowing the solid matter to stand for 2 to 3 days at about 20° C. to about 40° C. with water and with papain added thereto and then freeing the preparation from the remaining solid parts.

2. In the process of preparing physiologically active extracts from the anterior lobes of the hypophysis, the steps which comprise extracting the fresh anterior lobes of the hypophysis with an organic solvent, liquid at ordinary temperatures and capable of dissolving lipoids, separating the solution from the solid matter and allowing the solid matter to stand for 2 to 3 days at about 20° C. to about 40° C. with water and with papain added thereto, freeing the preparation from the remaining solid parts, treating the solution thus obtained with an organic solvent insoluble in water and separating the solvent from the aqueous layer.

3. In the process of preparing physiologically active extracts from the anterior lobes of the hypophysis, the steps which comprise extracting the fresh anterior lobes of the hypophysis with acetone, separating the solution from the solid matter and allowing the solid matter to stand for 2 to 3 days at about 20° C. to about 40° C. with water and with papain added thereto, freeing the preparation from the remaining solid parts, treating the solution thus obtained with ether and separating the ether from the aqueous layer.

CARL LUDWIG LAUTENSCHLÄGER.
WILLY LUDWIG.
FRITZ LINDNER.